(12) United States Patent
Eren et al.

(10) Patent No.: US 8,904,149 B2
(45) Date of Patent: Dec. 2, 2014

(54) PARALLELIZATION OF ONLINE LEARNING ALGORITHMS

(75) Inventors: Taha Bekir Eren, Richmond (CA); Oleg Isakov, Redmond, WA (US); Weizhu Chen, Haidian District (CN); Jeffrey Scott Dunn, Kirkland, WA (US); Thomas Ivan Borchert, Cambridge (GB); Joaquin Quinonero Candela, Cambridge (GB); Thore Kurt Hartwig Graepel, Cambridge (GB); Ralf Herbrich, Cambridge (GB)

(73) Assignee: Microsoft Corporation, Redmond, WA (US)

( * ) Notice: Subject to any disclaimer, the term of this patent is extended or adjusted under 35 U.S.C. 154(b) by 490 days.

(21) Appl. No.: 12/822,918

(22) Filed: Jun. 24, 2010

(65) Prior Publication Data

US 2011/0320767 A1 Dec. 29, 2011

(51) Int. Cl.
G06F 15/76 (2006.01)
G06F 9/02 (2006.01)
G06N 99/00 (2010.01)

(52) U.S. Cl.
CPC ............................ G06N 99/005 (2013.01)
USPC .......................................................... 712/30

(58) Field of Classification Search
None
See application file for complete search history.

(56) References Cited

U.S. PATENT DOCUMENTS 5,592,589 A    1/1997   Poon
7,631,008 B2  12/2009   Carson
2008/0281771 A1*  11/2008  Lai et al. .................. 706/55
2009/0043593 A1    2/2009  Herbrich
2010/0280985 A1*  11/2010  Duchon et al. ............ 706/52

OTHER PUBLICATIONS

Gonzalez, Low, Guestrin and O'Hallaron, "Distributed Parallel Inference on Large Factor Graphs", AUAI Press, Arlington, Virginia: Proceedings UAI '09 Proceedings of the Twenty-Fifth Conference on Uncertainty in Artificial Intelligence, 2009, pp. 203-212.*
Stern, Herbrich, Graepel, "Matchbox: Large Scale Online Bayesian Recommendations", ACM, International World Wide Web Conference Committee (IW3C2) WWW Apr. 2009, Madrid, Spain, pp. 1-10.*
Bifet and Kirkby, "Data Stream Mining, A Practical Approach", Center for Open Software INnovation, University of Waikato, Hamilton, New Zealand, Aug. 2009, pp. 1-161.*
Gonzalez, Low, Guestrin, "Residual Splash for Optimally Parallelizing Belief Propagation", Jouranal of Machine Language Research, vol. 5, Apr. 15, 2009, pp. 177-184.*

(Continued)

*Primary Examiner* — Kakali Chaki
*Assistant Examiner* — Walter Hanchak
(74) *Attorney, Agent, or Firm* — Joann Dewey; David Andrews; Micky Minhas

(57) ABSTRACT

Methods, systems, and media are provided for a dynamic batch strategy utilized in parallelization of online learning algorithms. The dynamic batch strategy provides a merge function on the basis of a threshold level difference between the original model state and an updated model state, rather than according to a constant or pre-determined batch size. The merging includes reading a batch of incoming streaming data, retrieving any missing model beliefs from partner processors, and training on the batch of incoming streaming data. The steps of reading, retrieving, and training are repeated until the measured difference in states exceeds a set threshold level. The measured differences which exceed the threshold level are merged for each of the plurality of processors according to attributes. The merged differences which exceed the threshold level are combined with the original partial model states to obtain an updated global model state.

17 Claims, 8 Drawing Sheets

(56) References Cited

OTHER PUBLICATIONS

Alcantara, Sharf, Abbasinejad, Sengupta, Mitzermacher, Owens, Amenta, Real-Time Parallel Hashing on the GPU, ACM, ACM Transactions on Graphics, vol. 28, No. 5, Proceedings of ACM SITGRAPH Asia 2009, 2009, pp. 154:1-154:9.*

Minka, "Divergence Measures and Message Passing", Microsoft Research Technical Report (MSR-TR-2005-173), 2005, pp. 1-17.*

Li, "Vairational Bayesian Image Processing on Stochastic Factor Graphs", Image Processing, 2008. ICIP 2008. 15th IEEE International Conference on, Oct. 12-15, 2008, pp. 1748-1751.*

C. Balkesen, N. Tatbul "Scalable Data Partitioning Techniques for Parallel Sliding Window Processing over Data Streams", VLDB International Workshop on Data Management for Sensor Networks (DMSN'11), Seattle, WA, USA, Aug. 2011.*

Joos-Hendrik Böse, Artur Andrzejak, Mikael Hogqvist, "Beyond Online Aggregation: Parallel and Incremental Data Mining with Online Map-Reduce", MDAC '10 Proceedings of the 2010 Workshop on Massive Data Analytics on the Cloud, Article No. 3, Apr. 26, 2010, pp. 1-6.*

Xinghao Pan, Jiaqi Tan, Soila Kavulya, Rajeev Gandhi, Priya Narasimhan, "Ganesha: Black-Box Fault Diagnosis for MapReduce Systems", ACM SIGMETRICS Performance Evaluation Review archive, vol. 37 Issue 3, Dec. 2009, pp. 8-13.*

Hung-chih Yang, Ali Dasdan, Ruey-Lung Hsiao, D. Stott Parker, "Map-Reduce-Merge: Simplified Relational Data Processing on Large Clusters", SIGMOD '07 Proceedings of the 2007 ACM SIGMOD international conference on Management of data, Jun. 12-14, 2007, pp. 1029-1040.*

Chan, Philip K., et al., "Toward Parallel and Distributed Learning by Meta-Learning", Knowledge Discovery in Databases Workshop, 1993, pp. 227-240, Columbia University, https://www.aaai.org/Papers/Workshops/1993/WS-93-02/WS93-02-020.pdf.

Chen, Ye, et al., "Large-Scale Behavioral Targeting", Jun. 28-Jul. 1, 2009, pp. 209-217, http://www.cc.gatech.edu/~zha/CSE8801/ad/p209-chen.pdf.

Agarwal, Deepak, et al., "Beyond Search: Computational Intelligence for the Web", Dec. 12-13, 2008, 3 pages, Whistler, British Columbia, Canada, http://research.microsoft.com/en-us/projects/beyond_search/talkabstracts.aspx.

Chakrabarti, Deepayan, et al., "Contextual Advertising by Combining Relevance with Click Feedback", Apr. 21-25, 2008, pp. 417-426, Beijing, China, http://www2008.org/papers/pdf/p417-chakrabarti.pdf.

Sculley, D., et al., "Predicting Bounce Rates in Sponsored Search Advertisements", Retrieved Date: Jan. 15, 2010, 9 pages, http://www.bayardo.org/ps/kdd2009.pdf.

* cited by examiner

PARALLELIZATION OF ONLINE LEARNING ALGORITHMS

BACKGROUND

Online machine learning algorithms are a class of algorithms which make decisions using historical data up to the present moment. Online machine learning algorithms are also known as streaming algorithms. Incremental training is then applied by each machine to learn one instance at a time. As new data becomes available, the algorithms do not require retraining on all data, since they continue to incrementally improve an existing model. Online algorithms have recently achieved improved efficiency over batch algorithms.

New larger scale problems have greatly increased the volume of data. Therefore, single machine solutions have been unable to provide satisfactory performance in efficient parallelization of online algorithms and still maintain accuracy.

SUMMARY

Embodiments of the invention are defined by the claims below. A high-level overview of various embodiments of the invention is provided to introduce a summary of the systems, methods, and media that are further described in the detailed description section below. This summary is neither intended to identify key features or essential features of the claimed subject matter, nor is it intended to be used as an aid in isolation to determine the scope of the claimed subject matter.

Embodiments of the invention include a dynamic batch strategy utilized in parallelization of online learning algorithms according to embodiments of the invention. This dynamic batch strategy provides a merge function on the basis of a threshold level difference between the original model state and an updated model state, rather than according to a constant or pre-determined batch size. Therefore, merges occur more frequently as the updated model state of a node diverges from the original model state. If the state of a node is not significantly different from the original state, then all nodes are in near agreement of the current state and a merge is not necessary.

A training process includes reading a batch of incoming streaming data, retrieving any missing model beliefs from partner processors, and learning on the batch of incoming streaming data. The steps of reading, retrieving, and learning (which includes updating local Bayesian parameters) are repeated until the measured difference in states exceeds a set threshold level. The model updates are applied to the respective plurality of processors. A processor can also request an updated partial model state from another processor, wherein the requesting processor stores the requested partial model state in its model container.

Other embodiments of the invention include computer-readable media, having instructions stored thereon, that when executed by a computing device, perform the above-described methods.

BRIEF DESCRIPTION OF THE DRAWINGS

Illustrative embodiments of the invention are described in detail below, with reference to the attached drawing figures, which are incorporated by reference herein, and wherein.

DETAILED DESCRIPTION

Figure 1:
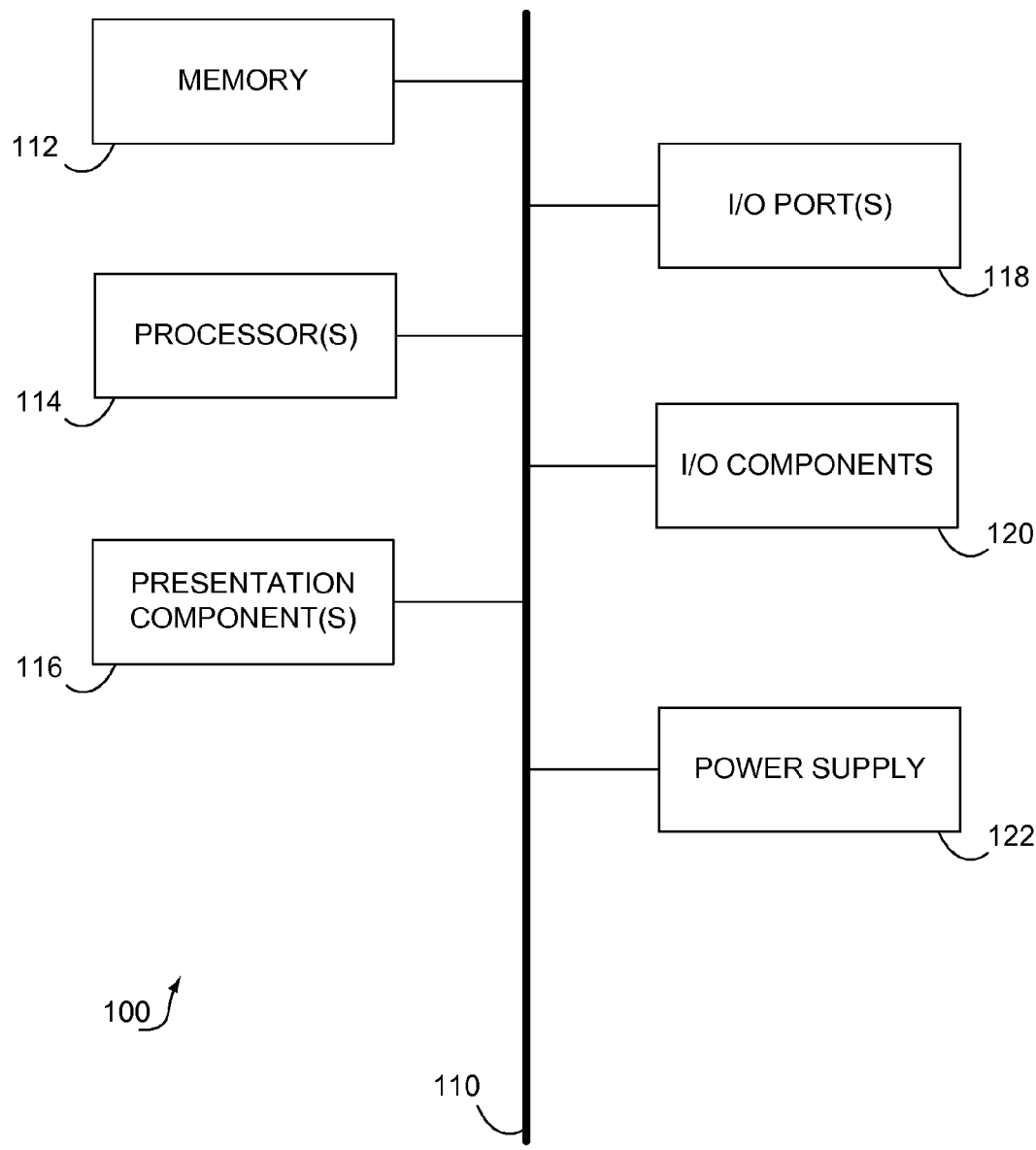
FIG. 1 is a block diagram illustrating an exemplary computer operating environment used in accordance with embodiments of the invention.

Embodiments of the invention provide systems, methods and computer-readable storage media for dynamically updating multiple processors in parallel. This detailed description and the following claims satisfy the applicable statutory requirements.

The terms "step," "block," etc. might be used herein to connote different acts of methods employed, but the terms should not be interpreted as implying any particular order, unless the order of individual steps, blocks, etc. is explicitly described. Likewise, the term "module," etc. might be used herein to connote different components of systems employed, but the terms should not be interpreted as implying any particular order, unless the order of individual modules, etc. is explicitly described.

Throughout the description of different embodiments of the invention, several acronyms and shorthand notations are used to aid the understanding of certain concepts pertaining to the associated systems, methods and computer-readable media. These acronyms and shorthand notations are intended to help provide an easy methodology for communicating the ideas expressed herein and are not meant to limit the scope of any embodiment of the invention.

Embodiments of the invention include, without limitation, methods, systems, and sets of computer-executable instructions embodied on one or more computer-readable media. Computer-readable media include both volatile and nonvolatile media, removable and non-removable media, and media readable by a database and various other network devices. By way of example, and not limitation, computer-readable storage media comprise media implemented in any method or technology for storing information. Examples of stored information include computer-useable instructions, data structures, program modules, and other data representations. Media examples include, but are not limited to, information-delivery media, random access memory (RAM), read-only memory (ROM), electrically erasable programmable read-only memory (EEPROM), flash memory or other memory technology, compact-disc read-only memory (CD-ROM), digital versatile discs (DVD), holographic media or other optical disc storage, magnetic cassettes, magnetic tape, magnetic disk storage, and other magnetic storage devices. These examples of media can be configured to store data momentarily, temporarily, or permanently. The computer-readable media include cooperating or interconnected computer-readable media, which exist exclusively on a processing system or distributed among multiple interconnected processing systems that may be local to, or remote from, the processing system.

Embodiments of the invention may be described in the general context of computer code or machine-useable instructions, including computer-executable instructions such as program modules, being executed by a computing system, or other machine or machines. Generally, program modules including routines, programs, objects, components, data structures, and the like refer to code that perform particular tasks or implement particular data types. Embodiments described herein may be implemented using a variety of system configurations, including handheld devices, consumer electronics, general-purpose computers, more specialty computing devices, etc. Embodiments described herein may also be implemented in distributed computing environments, using remote-processing devices that are linked through a communications network or the Internet.

In some embodiments, a computer-implemented method of dynamically updating multiple processors in parallel is described. A model state is partitioned into partial models according to a partitioning scheme. A local copy of an original partial model state is received into each of a plurality of processors. An incoming data stream is partitioned between the plurality of processors according to their partial distribution model. Each of the plurality of processors serially processes the partitioned incoming streaming data according to attributes to achieve a plurality of current partial model states. A difference between the original partial model state and its respective current partial model state is serially determined for each of the plurality of processors according to a divergence function. The determined differences which exceed a threshold level are merged for each of the plurality of processors according to the attributes. The merged differences which exceed the threshold level are combined with the original partial model states to obtain an updated global model state. In another embodiment, one or more computer-readable storage media contain computer-readable instructions embodied thereon that, when executed by a computing device, perform the above-described method of dynamically updating multiple processors in parallel.

In certain embodiments, a computer-implemented method of distributing a model in a parallelized learning system is described. A plurality of partitions of an original model state are assigned to a respective plurality of nodes according to outputs of a uniformly distributed hash function. The assigned plurality of partitions are loaded into respective model containers for each of the plurality of nodes. Each of the plurality of nodes are trained individually according to a partitioned parsed impressions stream to obtain a plurality of partitioned current model states. The calculated differences between the partitioned original model state and the corresponding partitioned current model state are merged after the training according to attributes for each of the plurality of nodes. The merged calculated differences are combined to the original model state to obtain an updated model state. In another embodiment, one or more computer-readable storage media contain computer-readable instructions embodied thereon that, when executed by a computing device, perform the above-described method of distributing a model in a parallelized learning system.

In yet other embodiments, a computer-implemented method of dynamically updating multiple processors is described. A plurality of partitions of an original model state are assigned to a respective plurality of nodes according to outputs of a uniformly distributed hash function. The assigned plurality of partitioned original model states are loaded into respective model containers in each of the plurality of nodes. Each of the plurality of nodes is trained on a respective batch of partitioned impressions stream according to attributes to obtain a plurality of partitioned current model states. A difference is determined between the partitioned original model state and the corresponding partitioned current model state for each of the plurality of nodes. The determined differences which exceed a threshold level are merged for each of the plurality of nodes according to the attributes. The merged differences which exceed the threshold level are combined with the partitioned original model states to obtain an updated global model state. In another embodiment, one or more computer-readable storage media contain computer-readable instructions embodied thereon that, when executed by a computing device, perform the above-described method of dynamically updating multiple processors.

Having briefly described a general overview of the embodiments herein, an exemplary computing device is described below. Referring initially to FIG. 1, an exemplary operating environment for implementing embodiments of the present invention is shown and designated generally as computing device 100. The computing device 100 is but one example of a suitable computing system and is not intended to suggest any limitation as to the scope of use or functionality of embodiments of the invention. Neither should the computing device 100 be interpreted as having any dependency or requirement relating to any one or combination of components illustrated. In one embodiment, the computing device 100 is a conventional computer (e.g., a personal computer or laptop). Embodiments of the invention are also applicable to a plurality of interconnected computing devices, such as computing devices 100.

The computing device 100 includes a bus 110 that directly or indirectly couples the following devices: memory 112, one or more processors 114, one or more presentation components 116, input/output (I/O) ports 118, input/output components 120, and an illustrative power supply 122. The bus 110 represents what may be one or more busses (such as an address bus, data bus, or combination thereof). Although the various blocks of FIG. 1 are shown with lines for the sake of clarity, delineating various components in reality is not so clear, and metaphorically, the lines would more accurately be gray and fuzzy. For example, one may consider a presentation component 116 such as a display device to be an I/O component 120. Also, processors 114 have memory 112. It will be understood by those skilled in the art that such is the nature of the art, and as previously mentioned, the diagram of FIG. 1 is merely illustrative of an exemplary computing device that can be used in connection with one or more embodiments of the invention. Distinction is not made between such categories as "workstation," "server," "laptop," "handheld device," etc., as all are contemplated within the scope of FIG. 1, and are referenced as "computing device" or "computing system."

The computing device 100 can include a variety of computer-readable media. By way of example, and not limitation, computer-readable media may comprise RAM, ROM, EEPROM, flash memory or other memory technologies, CDROM, DVD or other optical or holographic media, magnetic cassettes, magnetic tape, magnetic disk storage or other magnetic storage devices, or similar tangible media that are configurable to store data and/or instructions relevant to the embodiments described herein.

The memory 112 includes computer-storage media in the form of volatile and/or nonvolatile memory. The memory 112 may be removable, non-removable, or a combination thereof. Exemplary hardware devices include solid-state memory, hard drives, cache, optical-disc drives, etc. The computing device 100 includes one or more processors 114, which read data from various entities such as the memory 112 or the I/O components 120. The presentation components 116 present data indications to a user or other device. Exemplary presentation components 116 include display devices, speaker devices, printing devices, vibrating devices, and the like.

The I/O ports 118 logically couple the computing device 100 to other devices including the I/O components 120, some of which may be built in. Illustrative I/O components 120 include a microphone, joystick, game pad, satellite dish, scanner, printer, wireless device, etc.

The components described above in relation to the computing device 100 may also be included in a wireless device. A wireless device, as described herein, refers to any type of wireless phone, handheld device, personal digital assistant (PDA), BlackBerry®, smartphone, digital camera, or other mobile devices (aside from a laptop), which communicate wirelessly. One skilled in the art will appreciate that wireless devices will also include a processor and computer-storage media, which perform various functions. Embodiments described herein are applicable to both a computing device and a wireless device. In embodiments, computing devices can also refer to devices which run applications of which images are captured by the camera in a wireless device.

The computing system described above is configured to be used with the several computer-implemented methods, systems, and media generally described above and described in more detail hereinafter. The embodiments of the invention provide computer-implemented methods, systems, and media of parallelization of online learning algorithms. Parallelization of online learning algorithms applies the concept of machine incremental training to multiple training machines in parallel. Each training machine processes an assigned amount of streaming data independently from a partitioned original model state to form a partitioned current model state. All of the training machines are synchronized with the combined individual results of the partitioned current model states to obtain an updated global model state.

Figure 2:
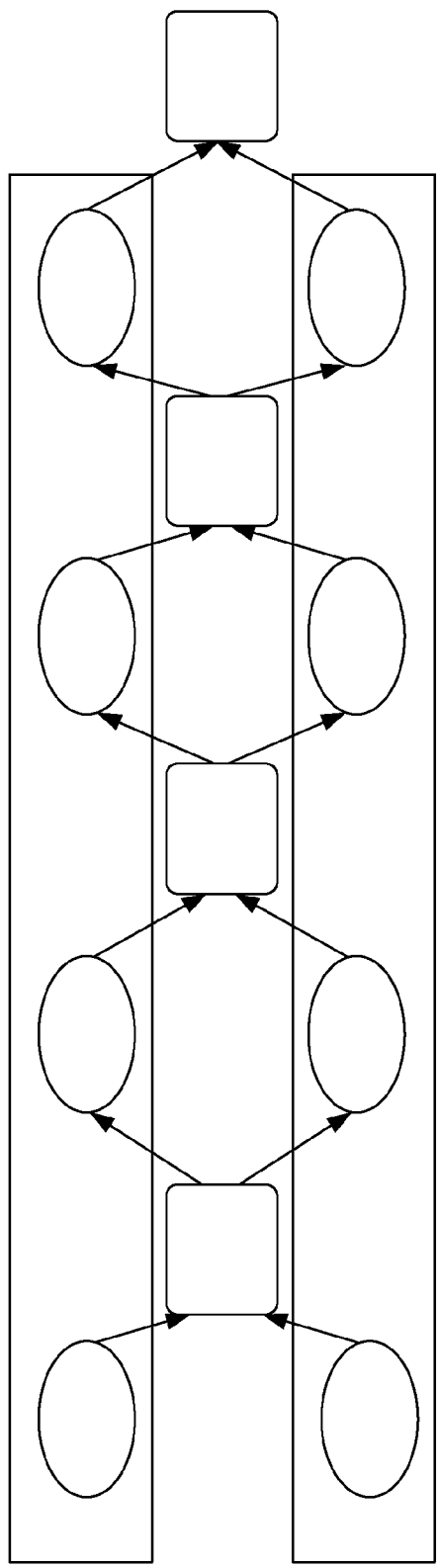
FIG. 2 is an illustration of a sample-wise strategy.
Figure 3:
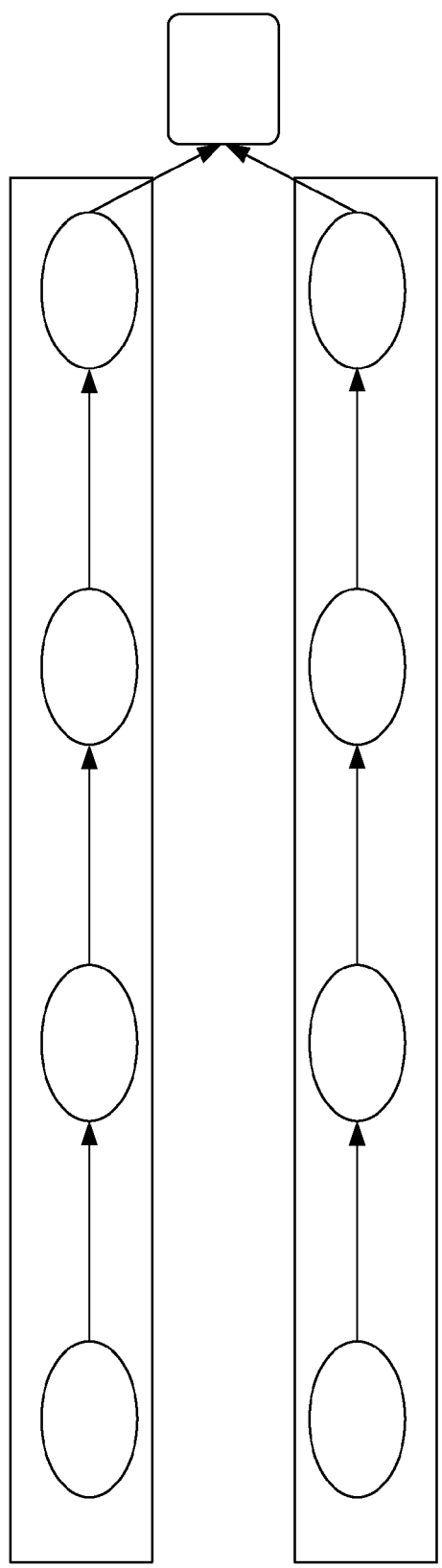
FIG. 3 is an illustration of a batch-wise strategy.
Figure 4:
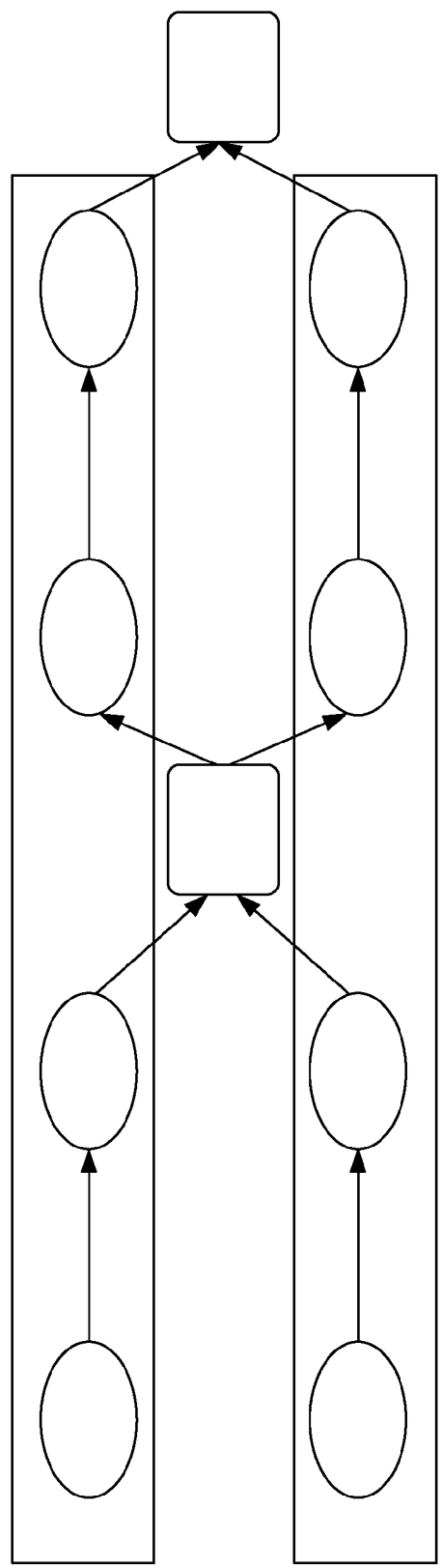
FIG. 4 is an illustration of a mini-batch strategy.

Online learning algorithms utilize various strategies to process some fixed number of instances and combine the results from multiple training machines. A sample-wise strategy is illustrated in FIG. 2. A merge of the processed information with the original model state occurs after each instance. This strategy would produce very accurate results, but would also be inefficient if a large volume of information needed to be processed because the communication and synchronization overhead would be very high. A batch-wise strategy is illustrated in FIG. 3. A merge of the processed information with the original model state occurs after all instances have been processed. This strategy would have limited accuracy if there was a large number of instances to be processed, but would also be very efficient since the merge does not occur until all information has been processed. A mini-batch strategy is illustrated in FIG. 4. A merge of the processed information with the original model state occurs after each set of instances. The mini-batch strategy attempts to balance the sample-wise and batch-wise strategies. However, the mini-batch strategy uses a pre-determined constant size batch, and therefore, is also limited in providing both efficient and accurate results.

Figure 5:
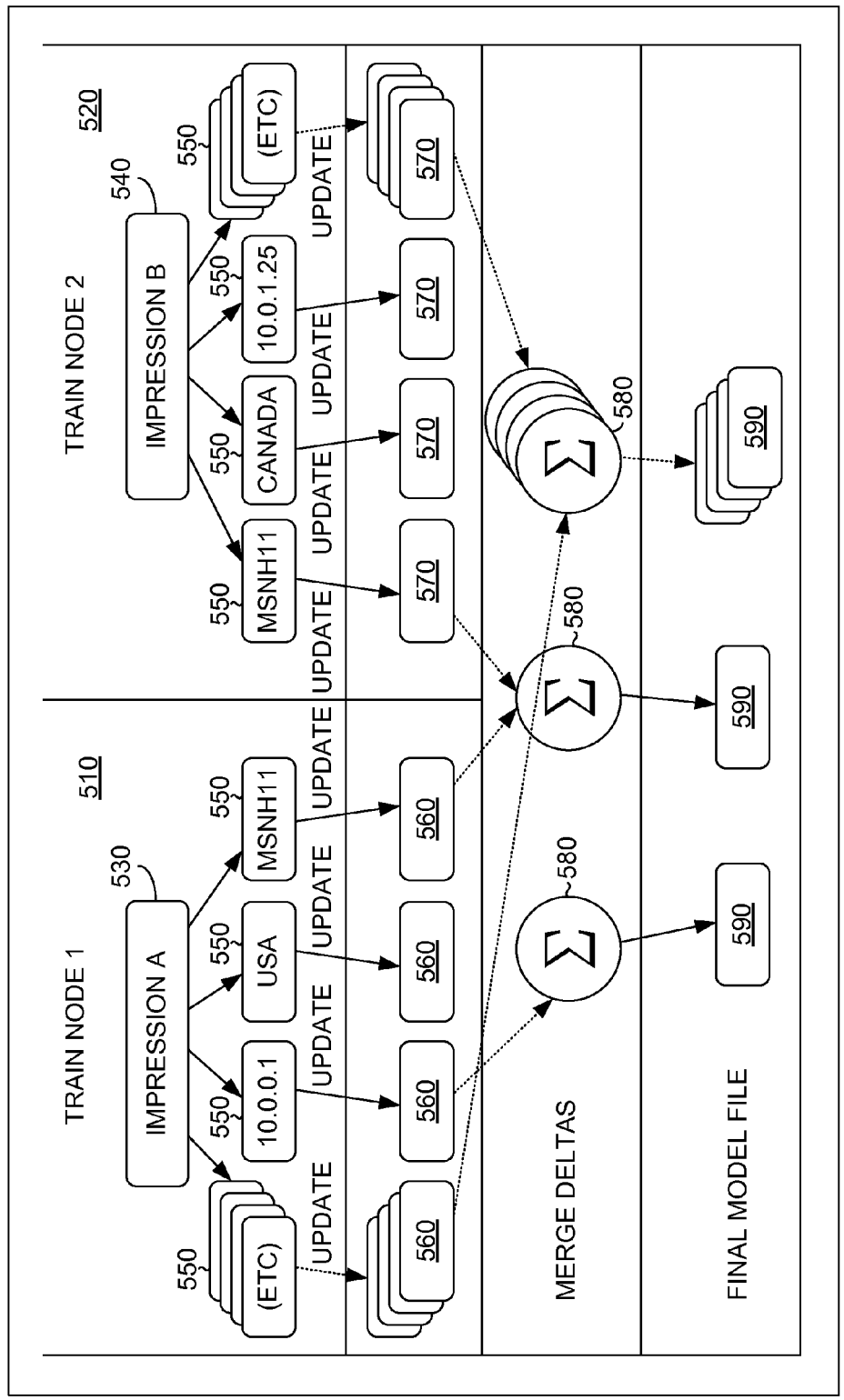
FIG. 5 is an illustration of a parallelization system used in accordance with embodiments of the invention.

FIG. 5 illustrates a parallelization system used with a dynamic batch strategy of online learning algorithms according to embodiments of the invention. This dynamic batch strategy provides a merge function on the basis of a threshold level difference between the original model state and a current model state, rather than according to a constant or pre-determined set of criteria. A plurality of nodes within the parallelization system are partitioned according to a partial distribution model. The partial distribution model utilizes a uniformly distributed hash function according to an embodiment of the invention.

FIG. 5 illustrates just two training nodes for ease of explanation. However, several nodes can be used in parallel and are contemplated within the scope of the invention. Each node loads a partition of an original model state into its model container. The first node 510 is assigned a partition of the original model state, which is loaded into the model container of the first node 510. Likewise, the second node 520 is assigned a different partition of the original model state, which is loaded into the model container of the second node 520. Each node is assigned a partitioned batch of data impressions or incoming data stream, wherein the data impressions or the incoming data stream is partitioned according to a uniformly distributed hash function. The uniformly distributed hash function used in the partitioning of the original model state may differ from the uniformly distributed hash function used in partitioning of the data impressions stream. The batch of parsed impressions stream 530 assigned to the first node 510 is opened. Another batch of parsed impressions stream 540 assigned to the second node 520 is also opened. Each of the first node 510 and the second node 520 independently train on their respective batches of assigned impressions according to attributes 550. Some of the attributes 550 from the first node 510 may be the same as some of the attributes 550 from the second node 520.

After the first node 510 has trained on the batch of impressions 530, a difference between the partitioned original model state and a first partition of a current model state 560 for each attribute 550 is calculated according to a divergence function. Divergence functions will be described in greater detail hereinafter. When the calculated difference is below a set threshold level, it is assumed that the difference between the partitioned original model state and the partitioned current model state 560 for that particular attribute 550 is negligible and the partitioned current model state 560 is essentially unchanged from the partitioned original model state. At this point, another batch of parsed impressions stream 530 is read, and training of the new batch occurs on the first node 510. A difference is then calculated between the partitioned original model state and the second partition of a current model state 560 for each attribute 550. If this calculated difference is still below the set threshold level, then the process is repeated until a difference between the partitioned original model state and the partitioned current model state 560 is above the set threshold level. When the difference between the partitioned original model state and the partitioned current model state 560 exceeds the set threshold level, then the calculated change in state for the first node 510 is applied to the partition of the first node 510. This same process is independently run on the second node 520 to obtain a partitioned current model state 570 for each attribute 550 until the difference between the partitioned original model state and the partitioned current model state 570 of the second node 520 is above the set threshold level. The calculated change in state above the set threshold level for the second node 520 is applied to the partition of the second node 520.

These calculated differences in state above the set threshold level for the first node 510 and the second node 520 are combined according to each attribute 550, as exemplified by the merge deltas 580. An updated global state 590 results from merging the calculated differences. The local cache data for each node is deleted and each node is updated with a new partitioned local model state, which is loaded into their respective model containers.

Figure 6:
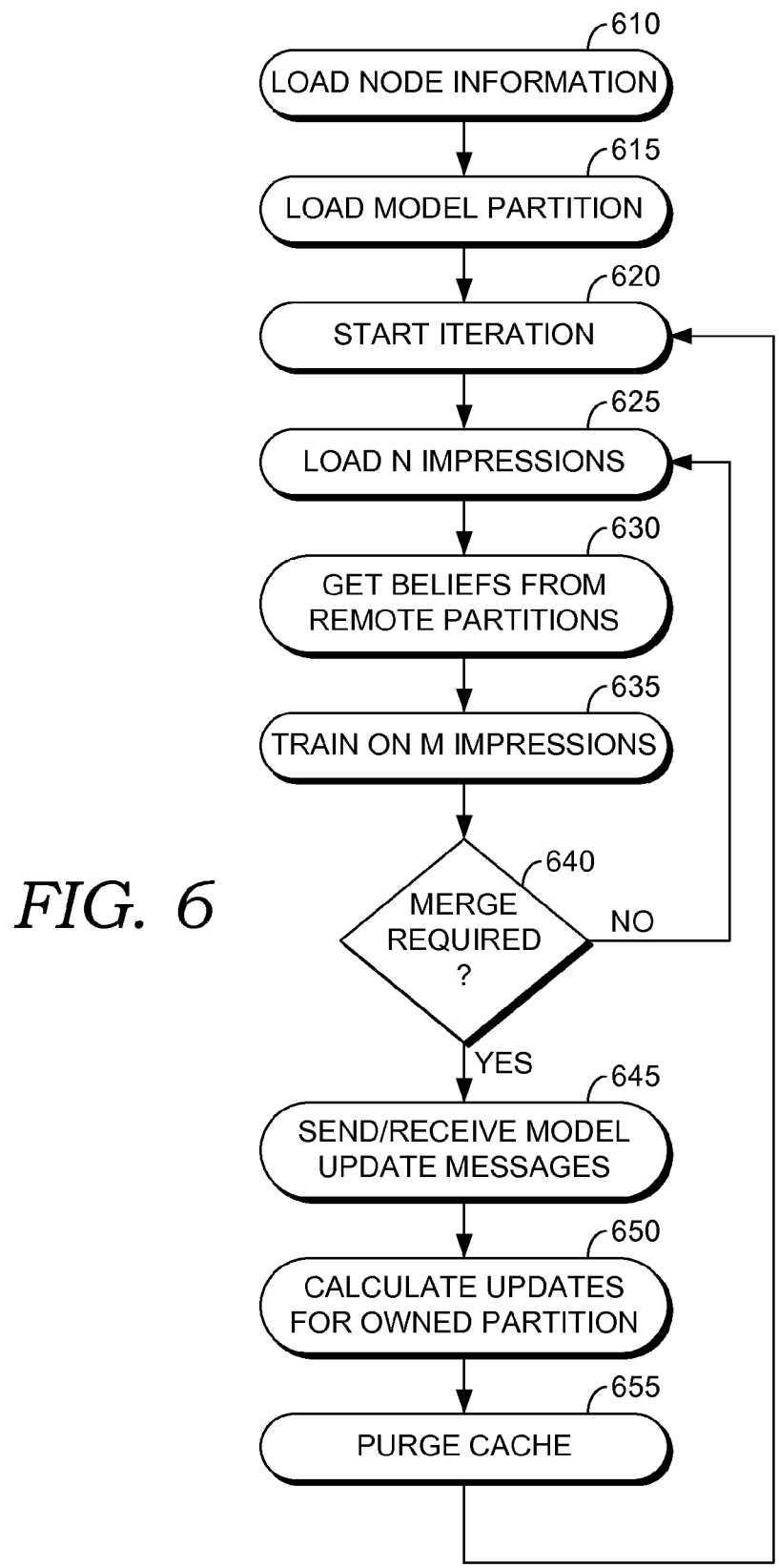
FIG. 6 is a flow diagram of a parallelization system used in accordance with embodiments of the invention.

FIG. 6 is a flow diagram representing a method of dynamically updating multiple processors in parallel using the parallelization system illustrated in FIG. 5. The flow diagram will be described for just one node, but as previously stated above, the complete parallelization system will contain at least two nodes and can include several nodes. Information is loaded into the node in step 610. This information could include a partition number, the location of the parallelization model state, the location of parsed impressions for this particular node, and the batch size for this training model. The partitioned original model state is loaded into the node in step 615. The training iteration begins in step 620. A partitioned batch of impressions for this particular node is loaded from the data impressions stream in step 625. The node will determine which necessary model beliefs currently exist in its cache and which beliefs are missing from its cache and therefore, will need to be retrieved from a partner node. The missing beliefs are then retrieved from one or more partner nodes in step 630. Training is then run on the revised batch of impressions in step 635. As stated above with reference to FIG. 5, the node trains on its respective batch of assigned impressions according to attributes, and then measures the difference in state between the partitioned original model state and the partitioned current model state to determine if a merge is required in decision 640. If the calculated difference is below the set threshold level, then a merge is not required and the process is repeated from step 625 until a threshold level difference between the partitioned original model state and the partitioned current model state is above the threshold level. Once a threshold level difference is measured, then a merge is required. If any beliefs were retrieved from partner nodes or any beliefs from partner nodes were retrieved from the subject node, then model update messages are sent accordingly in step 645. The node will update its model according to any update messages received and the calculated changes in state from the merge in step 650. After the node has been updated and an updated global state has been achieved, then the node's cache can be purged in step 655. The updated global state now becomes the new original global state, which can be partitioned between nodes to begin the process again at step 620. One or more computer-readable storage media containing computer readable instructions embodied thereon that, when executed by a computing device, perform the method described above of dynamically updating multiple processors in parallel.

Figure 7:
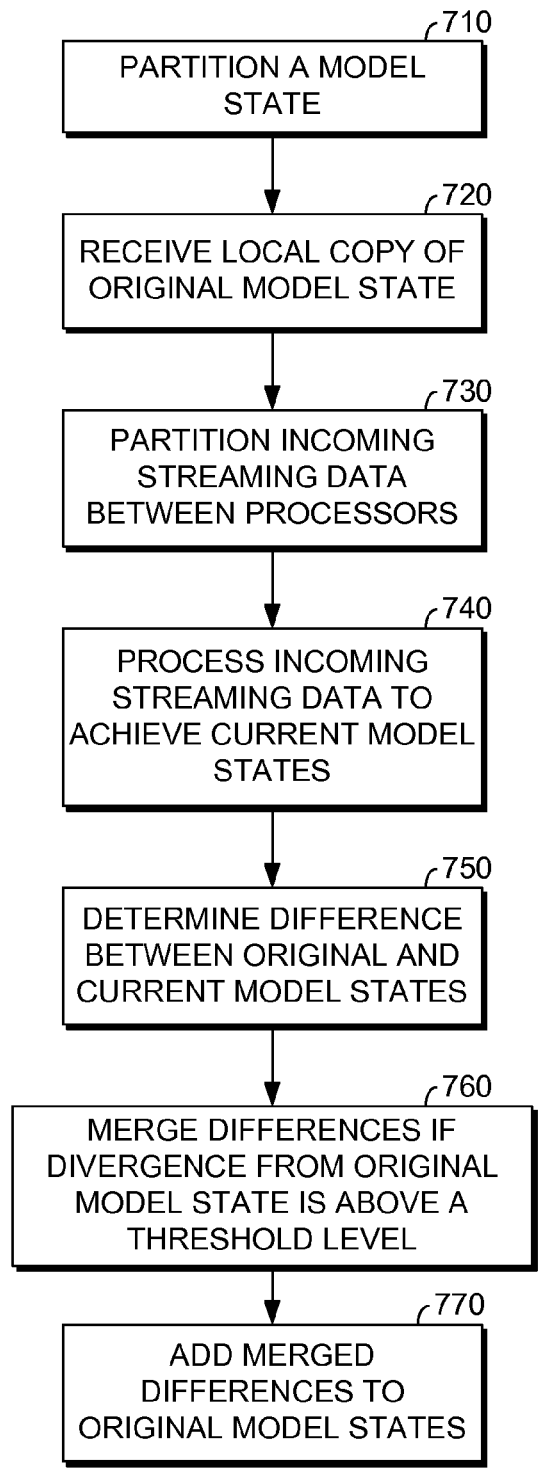
FIG. 7 is a flow diagram of a computer-implemented method of dynamically updating multiple processors in parallel used in accordance with embodiments of the invention.

A computer-implemented method of dynamically updating multiple processors in parallel will now be described with reference to the flow diagram of FIG. 7. This method comprises distributing a model in a parallelized learning system in an embodiment of the invention. When multiple processors will be working in parallel on a shared task, a model state is partitioned between the multiple processors using a partial distribution model in step 710. The partial distribution model utilizes a uniformly distributed hash function in an embodiment of the invention. An original model state is also partitioned between the plurality of processors in step 720, where each processor receives its local copy of the original model state. The partitioned original model state could utilize a uniformly distributed hash function in an embodiment of the invention. The plurality of processors will be processing online streaming data or impressions, which are partitioned between the processors according to their partial distribution model in step 730. Each of the processors has a model container, which contains its respective partial original model state, a local cache, and its respective partial current model state. Each of the processors serially processes the incoming partial streaming data according to one or more attributes in step 740. This independent processing results in a partial current model state for each processor. A difference between the partial original model state and the partial current model state is then calculated for each processor according to a divergence function in step 750. The divergence function could comprise one of a squared magnitude divergence, an incremental Kullback-Leibler (KL) divergence, or a posterior KL divergence. An incremental KL divergence compares how much the probability of predicting an event has been affected by the training since the last training update. Stated another way, a prediction is made before and after each training instance and the KL divergence between the two predictions is computed. The incremental KL divergence measures a divergence from a prediction prior to a data point to a prediction posterior of the data point. A posterior KL divergence measures the difference between a distribution of weights from the partial original model state to the partial current model state. The calculated differences which are above a set threshold level are merged with calculated differences above the set threshold level from other processors for each attribute in step 760. In a specific embodiment of the invention, this merging step comprises reading a batch of incoming streaming data, retrieving any missing model beliefs from partner processors, and training on the batch of incoming streaming data. The steps of reading, retrieving, and training are repeated until the measured difference in states exceeds the set threshold level. The model updates are applied to the respective plurality of processors. A processor can also request an updated partial model state from another processor, wherein the requesting processor stores the requested partial model state in its model container. The merged differences are then combined with the original model states to obtain an updated global state in step 770. This updated global state becomes the new original global state, wherein the new original global state is partitioned between processors as previously described, and then input into the respective processors. One or more computer-readable storage media containing computer readable instructions embodied thereon that, when executed by a computing device, perform the method described above of dynamically updating multiple processors in parallel.

Figure 8:
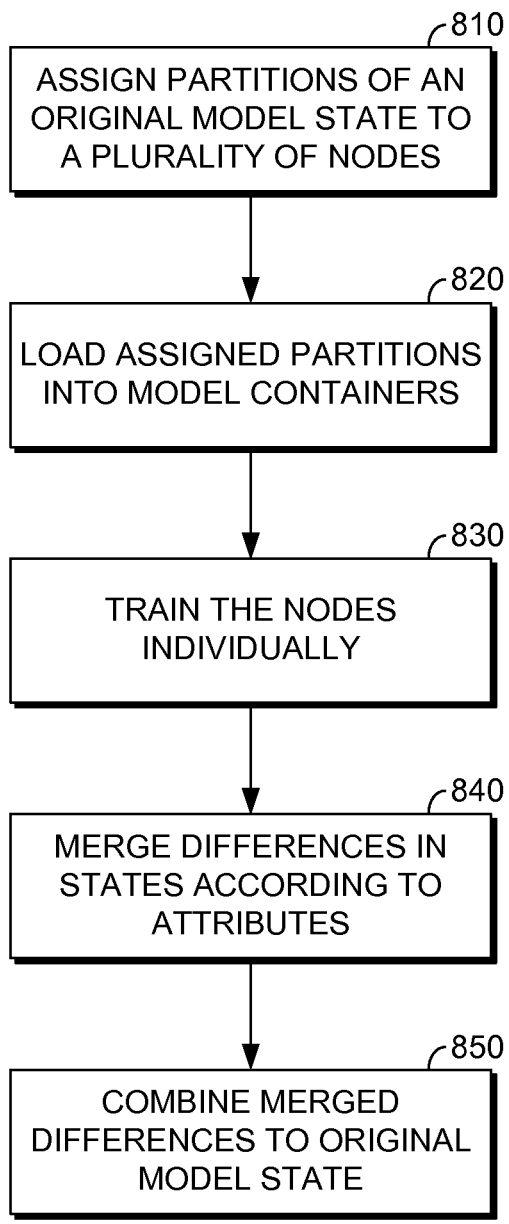
FIG. 8 is a flow diagram of a computer-implemented method of distributing a model in a parallelized learning system.

A computer-implemented method of dynamically updating multiple processors will now be described with reference to the flow diagram of FIG. 8. A plurality of partitions of an original model state are assigned to a respective plurality of nodes in step 810. The partitions can be assigned according to outputs of a uniformly distributed hash function. The assigned partitions are then loaded into respective model containers of each of the nodes in step 820. Some of the assigned partitions in a first model container may partially overlap with some of the assigned partitions in a second model container. An original model state partition can also be loaded from the model container of a first node into the local cache of a second node upon a request from the second node. The individual nodes are then trained according to their partitioned parsed impressions stream to obtain partitioned current model states for each node in step 830. A set of tuples, such as a unique impression identifier, a feature value, or two or more concatenated values, can be joined to the partitioned current model states. As previously described above, a difference is calculated between each partial original model state and a partial updated model state according to individual attributes present. If that difference in states is above a set threshold level, then the difference in states for all nodes is merged for each individual attribute in step 840. These merged differences comprise a dynamic batch of calculated differences above a threshold level. The dynamic batch is based upon one or more variable conditions, such as an impressions count or on the count of changed beliefs. Those merged differences are then combined with the original model state to obtain an updated global model state in step 850. The updated global model state then becomes the new initial model state for calculating a second dynamic batch.

One or more computer-readable storage media containing computer readable instructions embodied thereon that, when executed by a computing device, perform the method described above of dynamically updating multiple processors.

A combined computer-implemented method comprising some or all of the features described above for the computer-implemented method of dynamically updating multiple processors in parallel and the computer-implemented method of distributing a model in a parallelized learning system is contemplated within the scope of the invention. One or more computer-readable storage media containing computer readable instructions embodied thereon that, when executed by a computing device, perform some or all of the combined method steps described above is also contemplated within the scope of the invention.

Many different arrangements of the various components depicted, as well as embodiments not shown, are possible without departing from the spirit and scope of the invention. Embodiments of the invention have been described with the intent to be illustrative rather than restrictive.

It will be understood that certain features and subcombinations are of utility and may be employed without reference to other features and subcombinations and are contemplated within the scope of the claims. Not all steps listed in the various figures need be carried out in the specific order described.

The invention claimed is:

1. A computer-implemented method of dynamically updating multiple processors in parallel using a computing system having a processor, memory, and data storage subsystems, the computer-implemented method comprising:
   partitioning an original model state into a plurality of partial models according to a partial distribution scheme;
   receiving a local copy of a partial original model state into each of a plurality of processors;
   partitioning incoming streaming data between the plurality of processors according to their partial distribution model;
   serially processing the partitioned incoming streaming data by each of the plurality of processors according to attributes to achieve a plurality of partial current model states;
   serially calculating a difference between the partial original model state and the respective partial current model state for each of the attributes for each of the plurality of processors according to a divergence function measured by one of a squared magnitude divergence, an incremental Kullback-Leibler (KL) divergence, or a posterior KL divergence;
   for each of the attributes for each of the plurality of processors, comparing the calculated differences with a predetermined threshold level;
   for each of the attributes for each of the plurality of processors, dynamically merging the calculated differences that exceed the predetermined threshold level, where the dynamically merging occurs as frequently as the partial current model state diverges from the partial original model state; and
   combining the merged calculated differences that exceed the predetermined threshold level with the partial original model states to obtain an updated model state that replaces the original model state.

2. The computer-implemented method of claim 1, wherein partitioning the plurality of processors according to a partial distribution model utilizes a uniformly distributed hash function.

3. The computer-implemented method of claim 1, wherein each of the plurality of processors comprises a model container containing its respective partial original model state, a local cache, and its respective partial current model state.

4. The computer-implemented method of claim 3, further comprising: requesting, by a requesting processor, an updated partial model state from another processor and storing it in the model container of the requesting processor.

5. The computer-implemented method of claim 1, further comprising:
   partitioning the updated model state according to the partial distribution scheme; and
   inputting the partitioned updated model states into the respective plurality of processors.

6. The computer-implemented method of claim 1, wherein the merging comprises:
   reading a batch of incoming streaming data;
   retrieving any missing model beliefs from partner processors;
   training on the batch of incoming streaming data;
   repeating the reading, the retrieving, and the training until a merge is required;
   applying the updated global model state to the respective plurality of processors; and
   resetting each local cache to synchronize each of the plurality of processors.

7. The computer-implemented method of claim 1, wherein the computer-implemented method comprises a parallelized online algorithm.

8. A computer-implemented method of distributing a model in a parallelized learning system using a computing system having a processor, memory, and data storage subsystems, the computer-implemented method comprising:
   assigning a plurality of partitions of an original model state to a respective plurality of nodes according to outputs of a uniformly distributed hash function;
   loading the assigned plurality of partitions into a respective plurality of model containers of each of the plurality of nodes;
   training each of the plurality of nodes individually according to a partitioned parsed impressions stream to obtain a plurality of partitioned current model states;
   calculating differences between each of the plurality of partitioned original model states and each of the corresponding partitioned current model states;
   comparing the calculated differences to a predetermined threshold level;
   merging the calculated differences that exceed the predetermined threshold level; and
   combining the merged calculated differences with the partitioned original model state to obtain an updated global model state.

9. The computer-implemented method of claim 8, further comprising: loading an original model state partition from a first node model container of a first node into a local cache of a second node of the plurality of nodes upon a request from the second node.

10. The computer-implemented method of claim 8, wherein the merging calculated differences utilizes an incremental Kullback-Leibler divergence of measuring a divergence from a prediction prior to a data point to a prediction posterior of the data point for each of the plurality of nodes.

11. The computer-implemented method of claim 8, wherein the merging calculated differences utilizes a posterior Kullback-Leibler divergence of measuring a difference between a distribution of weights from the partitioned original model state to the partitioned current model state for each of the plurality of nodes.

12. The computer-implemented method of claim 8, wherein the updated global model state comprises an initial global model state for calculating a second dynamic batch.

13. The computer-implemented method of claim 8, wherein some of the assigned plurality of partitions in a first model container overlap with some of the assigned plurality of partitions in a second model container.

14. The computer-implemented method of claim 8, wherein a set of tuples can be joined to each of the plurality of partitioned current model states.

15. One or more computer storage hardware devices storing computer readable instructions embodied thereon that, when executed by a computing device, cause the computing device to perform a method of dynamically updating multiple processors, the method comprising:

assigning a plurality of partitions of an original model state to a respective plurality of nodes according to outputs of a uniformly distributed hash function;

loading the assigned plurality of partitioned original model states into a respective plurality of model containers in each of the plurality of nodes;

training each of the plurality of nodes on a respective batch of partitioned impressions stream according to attributes to obtain a plurality of partitioned current model states;

determining a difference between the partitioned original model state and its corresponding partitioned current model state for each of the plurality of nodes, the determining the difference utilizes a divergence function of a squared magnitude divergence, an incremental Kullback-Leibler (KL) divergence, or a posterior KL divergence;

comparing the determined differences for each of the plurality of nodes to a threshold level;

according to the attributes, for each of the plurality of nodes, merging the determined differences that exceed the threshold; and combining the merged determined differences that exceed the threshold level with the partitioned original model states to obtain an updated global model state.

16. The devices of claim 15, further comprising: requesting, by requesting node, an updated partial global state from another node and storing it in a model container of the requesting node.

17. The devices of claim 15, wherein the determining the difference is based upon one or more variable conditions to obtain a dynamic batch of determined differences.

* * * * *